(12) United States Patent
Dzierzak et al.

(10) Patent No.: US 12,005,841 B2
(45) Date of Patent: Jun. 11, 2024

(54) EXTERIOR VISION UNIT

(71) Applicant: MCi (Mirror Controls International) Netherlands B.V., Woerden (NL)

(72) Inventors: Jakub Jan Dzierzak, Woerden (NL); Meindert Jan Solkesz, Woerden (NL)

(73) Assignee: MCI (MIRROR CONTROLS INTERNATIONAL) NETHERLANDS B.V., Woerden (NL)

( * ) Notice: Subject to any disclaimer, the term of this patent is extended or adjusted under 35 U.S.C. 154(b) by 582 days.

(21) Appl. No.: 17/289,903

(22) PCT Filed: Oct. 30, 2019

(86) PCT No.: PCT/NL2019/050714
§ 371 (c)(1),
(2) Date: Apr. 29, 2021

(87) PCT Pub. No.: WO2020/091598
PCT Pub. Date: May 7, 2020

(65) Prior Publication Data
US 2022/0001811 A1 Jan. 6, 2022

(30) Foreign Application Priority Data
Oct. 30, 2018 (NL) .................................... 2021899

(51) Int. Cl.
*B60R 11/04* (2006.01)
*B60R 1/074* (2006.01)
*B60R 11/00* (2006.01)
(52) U.S. Cl.
CPC ............... *B60R 11/04* (2013.01); *B60R 1/074* (2013.01); *B60R 2011/004* (2013.01); *B60R 2011/0092* (2013.01); *B60R 2011/0094* (2013.01)

(58) Field of Classification Search
CPC . B60R 11/04; B60R 1/074; B60R 2011/0094; B60R 2001/1253
See application file for complete search history.

(56) References Cited

U.S. PATENT DOCUMENTS

2006/0256459 A1  11/2006  Izabel et al.
2013/0294758 A1* 11/2013  Barthel .................... B60R 11/04
                                                        396/428

FOREIGN PATENT DOCUMENTS

CN     108349440 A    7/2018
CN     207747843 U    8/2018
(Continued)

*Primary Examiner* — Christopher E Mahoney
(74) *Attorney, Agent, or Firm* — Volpe Koenig

(57) ABSTRACT

The invention relates to an exterior vision unit for a vehicle. The unit includes a base for attachment to the vehicle and a swiveling housing mounted at the base which can be swiveled at least between a park position, a work position, and an extreme overfold position. The housing includes a camera unit with a lens. The exterior viewing unit includes an adjustable cover for temporarily covering the lens. The cover is adjustable between a cover position and a release position. It also includes an adjustment device for adjusting the cover between its cover position and release position or vice versa. The adjustment device is fitted with an adjusting device connected to the cover in such a way that the cover adjusts when the adjusting device is moved. The adjustment device further includes an initial movable gripping device designed for temporary engagement with the adjusting device linked to the cover.

27 Claims, 9 Drawing Sheets

(56) References Cited

FOREIGN PATENT DOCUMENTS

Figure 1:
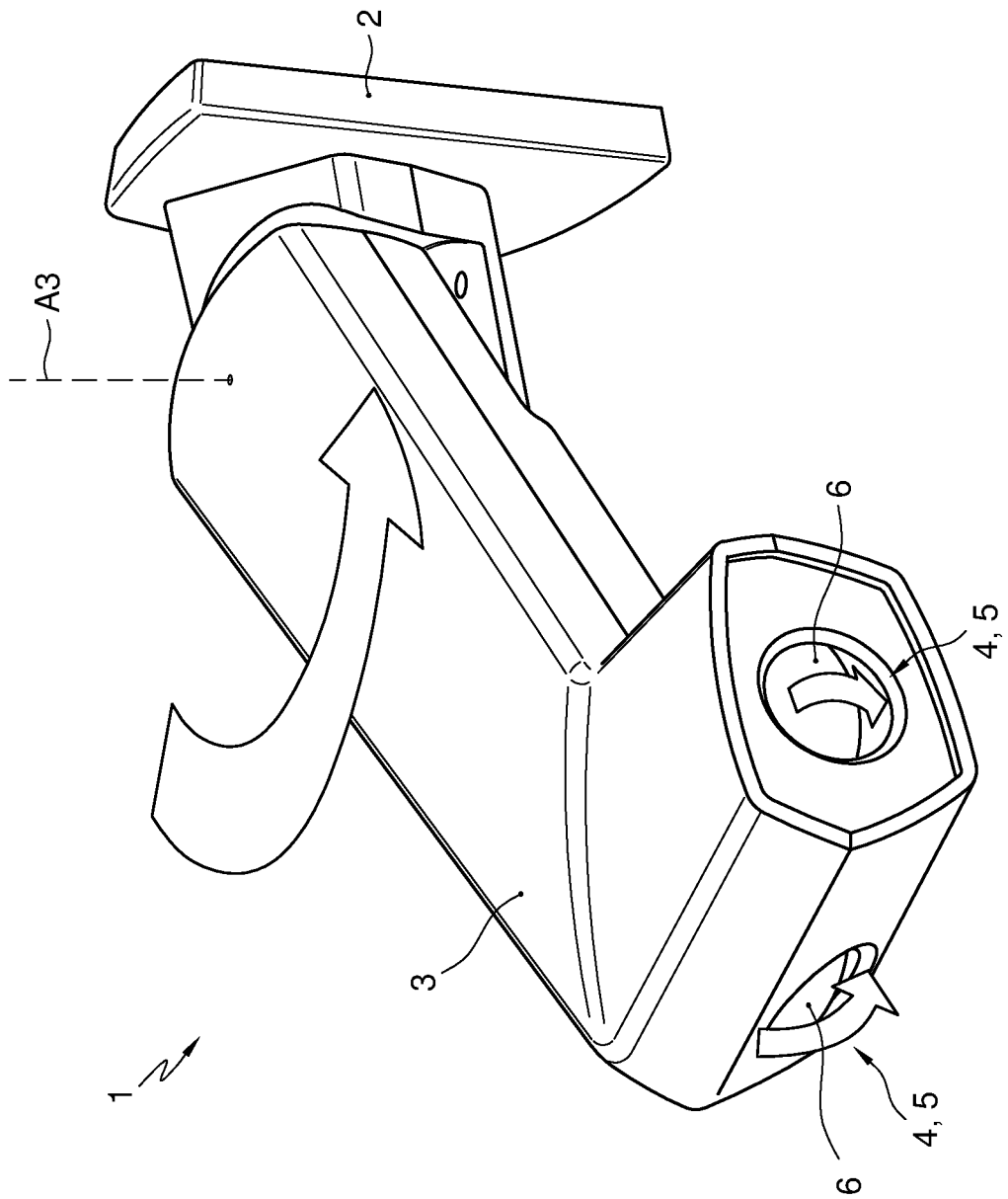

| | | | | | |
|---|---|---|---|---|---|
| DE | 102019208749 | A1 | * | 5/2020 | ............... B60R 1/00 |
| EP | 2743768 | A1 | * | 6/2014 | ............ B60R 11/04 |
| EP | 3248842 | A1 | * | 11/2017 | ............... B60Q 1/36 |
| JP | 2021059218 | A | * | 4/2021 | ............... B60R 1/00 |
| WO | 2017/048126 | A1 | | 3/2017 | |

* cited by examiner

EXTERIOR VISION UNIT

CROSS REFERENCE TO RELATED APPLICATIONS

This application is a 35 USC § 371 National Stage application of International Patent Application No. PCT/NL2019/050714, which was filed Oct. 30, 2019, entitled "EXTERIOR VISION UNIT" which claims priority to Netherlands Patent Application No. 2021899, filed Oct. 30, 2018 and is incorporated herein by reference as if fully set forth.

The invention relates to an exterior vision unit for a vehicle, such as a motor vehicle. In particular, the exterior vision unit comprises a base for attachment to the vehicle, a housing which is pivotably mounted to the base and is pivotable at least between i) a park position, ii) a work position and iii) an extreme overfold position, a camera unit with a lens, accommodated in the housing, and an adjustable cover for temporarily covering the lens, which cover is adjustable between a covering position, in which it covers the lens of the camera unit, and a release position, in which the lens of the camera unit is released by the cover.

Such exterior vision units are known and are usually used to observe and/or monitor the position of the vehicle with respect to the surroundings.

Such an exterior vision unit is for instance disclosed in Dutch patent application NL2019024, not published yet.

When the vehicle is not in use, by virtue of the cover the lens can be protected, for example from weather influences and/or damage by mishaps or by vandalism.

The exterior vision unit may comprise an adjustment device for adjusting the cover between its covering position and its release position or vice versa. As a consequence of such an adjustment device, which can for instance comprise inter alia an actuator, in particular an electric motor, it may be hard to make a relatively compact housing. A relatively compact housing, however, may be desirable, for example from an aesthetic point of view or because a relatively large housing in its work position may cause relatively much air resistance, with the consequence that driving the vehicle may for instance take relatively much energy and/or that relatively much noise may be produced as a result of driving wind.

Furthermore, from WO 2017/048126 A1 an exterior vision unit is known, having a base which may be located in a body of a vehicle, wherein the exterior vision unit comprises a housing in which a camera unit is accommodated, wherein the housing is mounted to the base pivotably between a i) work position in which the camera housing projects with respect to the base and with respect to the body, in which work position the lens of the camera unit is released in order to provide vision to the camera unit, and a ii) storage position in which the camera housing is substantially folded into the base. The camera housing pivotably mounted to the base is free of any adjustable cover to cover the lens.

The object of the invention is to provide an alternative exterior vision unit, in particular an alternative exterior vision unit which counteracts at least one disadvantage of one or more existing exterior vision units. More particularly, the object of the invention is to provide an alternative exterior vision unit having a relatively compact housing.

The invention provides an exterior vision unit for a vehicle, preferably a motor vehicle, comprising a base for attachment to the vehicle, a housing which is pivotably mounted to the base and which is pivotable at least between i) a park position, ii) a work position and iii) an extreme overfold position, a camera unit with a lens accommodated in the housing, an adjustable cover for temporarily covering the lens and which is adjustable between a covering position in which it covers the lens of the camera unit and a release position in which the lens of the camera unit is released by the cover, and an adjustment device for adjusting the cover between its covering position and its release position or vice versa, wherein the adjustment device comprises an adjusting element which is coupled with the cover, such that the cover adjusts when the adjusting element is moved, and a first displaceable engaging element which is configured to temporarily engage the adjusting element coupled with the cover.

Due to the first displaceable engaging element being configured to temporarily engage the adjusting element coupled with the cover, the adjusting element does not have to be continuously connected with the displaceable engaging element of the adjustment device. This can be very advantageous. For instance, a stroke which the engaging element, which may for instance be provided at a distal end of a flexible cable or other transfer element, can make when the displaceable engaging element is displaced, does not have to correspond exactly to the stroke which the adjusting element should make to adjust the cover from its release position into its covering position or vice versa. In particular, the first displaceable engaging element, when it is displaced to proceed to adjust the adjustable cover between its covering position and its release position, can make a larger stroke than the stroke that the adjusting element itself makes from its release position into its covering position or vice versa. The displaceable engaging element can thus, for instance, already make a portion of its stroke before it engages the adjusting element coupled with the cover. Alternatively or additionally, it may also be, for example, that the engaging element still makes a residual part of its stroke, and so is displaced still further, after the cover has already been wholly adjusted and so the adjusting element coupled with that cover has already finished its stroke. As the magnitude of the stroke or displacement of the displaceable engaging element and the magnitude of the stroke or displacement of the adjusting element coupled with the cover do not have to be equal to each other because the first displaceable engaging element is configured to temporarily engage the adjusting element, the product tolerances, for example, do not have to be very highly accurate to ensure that the cover is actually opened far enough and/or is actually closed far enough. Additionally or alternatively, as the stroke of the engaging element thus does not have to be exactly equal to the stroke of the adjusting element, also the drawback can be counteracted that the cover in the course of time cannot be properly adjusted anymore if dimensions of certain parts of the exterior vision unit, in particular of its adjustment device, change during use and/or during the life of the exterior vision unit, for example as a result of wear, stretching or temperature changes. As a flexible cable or other transfer element that may be provided with the displaceable engaging element is not continuously coupled with the adjusting element, due to the displaceable engaging element being configured to engage the adjusting element temporarily, for instance changes in the length of the transfer element, for example as a result of thermal expansion due to temperature differences and/or for instance as a result of elongation in the course of time, can be absorbed relatively simply, without this needing to influence the extent to which the cover is adjustable and/or without the covering position and/or the release position being improperly defined.

Due to the displaceable engaging element being configured to temporarily engage the adjusting element coupled with the cover, it can hence be counteracted, for example, that the lens is not wholly released, which, for example in the case of an autonomously driving vehicle, can have major adverse effects. On the other hand, this can also counteract the lens not being protected well, as a result of which it could then get damaged and/or polluted relatively fast.

The exterior vision unit may be configured such that when the first displaceable engaging element is moved while being in temporary engagement with the adjusting element, the adjusting element coupled with the cover moves along with the first displaceable engaging element so that the cover is adjusted between its covering position and its release position or vice versa.

Preferably, the adjustment device is also provided with a driving device for having the first displaceable engaging element move. In particular, the driving device may then be located at a distance from the first displaceable engaging element. More particularly, the adjustment device may then be furthermore provided with a transfer element for transferring a movement of the driving device to the first displaceable engaging element, while the transfer element on a first side, for example at or near a first end, is coupled with the driving device and on a second side, in particular at or near a second end, is provided with the first displaceable engaging element, and the transfer element being movable from an initial position in which the first displaceable engaging element is not yet in such a manner in engagement with the adjusting element that the first displaceable engaging element can cause the adjusting element to move, via at least a first intermediate position of the transfer element in which the first displaceable engaging element engages the adjusting element and causes it to move along with the first displaceable engaging element, to an end position of the transfer element.

By providing the transfer element, which can comprise an elongated transfer element, such as, for example, a flexible cable, in particular a Bowden cable, or a rigid drive shaft, at least a part of the driving device, which can comprise for example an electric motor, can be placed at a distance from the cover. As the driving device hence does not need to be placed near the camera unit, for example a relatively high degree of freedom of design can be afforded and/or, for example, a relatively compact housing can be used.

As the transfer element, which on a first side may be coupled with the driving device, and on a second side, in particular at or near a second end, may be provided with the first displaceable engaging element which is configured to temporarily engage the adjusting element coupled with the cover, the adjusting element does not have to be continuously connected with the driving device. As already elucidated hereinabove, this facilitates the cover being relatively well adjustable.

As will be appreciated by the skilled person, for a proper functioning, the exterior vision unit may be configured such that, during use of the camera unit accommodated in the housing of the exterior vision unit, the housing should leave the lens of the camera unit accommodated therein at least partly clear, in particular on a side of the lens facing outward, in order to allow the camera unit to be used. In particular, the side of the lens directed outwards can be regarded as the front of the lens.

The housing, in which the camera unit is accommodated, can be regarded as a camera housing. The adjustable cover may be fitted to, on and/or in the housing. The adjustable cover, which concerns a different part than the housing and also concerns a different part than the base, may be adjustable relative to the housing for temporarily covering the lens, in particular the side thereof that faces outward, so that the cover is adjustable between the covering position, in which it covers the lens of the camera unit, and the release position, in which the lens of the camera unit is released by the cover. It will be clear that the cover during covering of the lens may be located over the lens, in particular may be located in front of the front side or outwardly facing side of the lens, and that the cover upon release of the lens can be moved away so that it no longer covers the lens, and so is then no longer located in front of the front or outwardly facing side of the lens.

The cover may for instance be rotatable relative to the housing. Alternatively or additionally, the cover may for example be slidable relative to the housing.

Preferably, the lens of the camera unit accommodated in the housing, and more preferably the whole camera unit, may be placed substantially rigidly in the housing. For example in such embodiments, the cover may be adjusted relative to the lens, for example by sliding and/or rotation of the cover relative to the lens, with the cover, accordingly, then being adjustable between the covering position, in which it covers the lens of the camera unit, and the release position, in which the lens of the camera unit is released by the cover.

In a preferred embodiment according to an aspect of the invention, the exterior vision unit is so configured that, in the end position of the transfer element, the first displaceable engaging element is no longer in such a manner in engagement with the adjusting element coupled with the cover that the first displaceable engaging element can cause the adjusting element to move. In consequence, it holds that the stroke which the transfer element makes not only at the beginning of the movement does not have to align exactly with the movement of the adjusting element and hence with the movement of the cover coupled therewith, but also at the end of the movement the stroke which the transfer element makes does not have to correspond exactly to the stroke of the movement which the adjusting element makes.

In a preferred embodiment, the transfer element on its second side, in particular at or near the second end, is provided with a second displaceable engaging element which is configured to temporarily engage the adjusting element coupled with the cover, so that, when the engaging element is moved while it is in temporary engagement with the adjusting element, the adjusting element coupled with the cover moves along with the second displaceable engaging element so that the cover is adjusted between its release position and its covering position or vice versa, and the transfer element being movable from the end position via at least a second intermediate position in which the second displaceable engaging element engages the adjusting element and causes it to move along with the second displaceable engaging element, to the initial position in which the second displaceable engaging element is no longer in such a manner in engagement with the adjusting element that the second displaceable engaging element can cause the adjusting element to move. As a result, also upon movement of the cover the other way, that is, for example, upon opening instead of upon closing, the stroke which the transfer element makes can deviate from the stroke which the adjusting element makes, because the other way too, the transfer element can be brought into and out of engagement with the adjusting element and so is merely temporarily coupled therewith, or, as it were, is detachable coupled therewith. Preferably, the exterior vision unit is then configured such that, in the end position of the transfer element, the second displaceable engaging element is not yet in engagement with the adjusting element coupled with the cover, so that the stroke which the transfer element makes, both at the beginning and at the end of its movement, does not have to correspond exactly with the stroke of the movement which the adjusting element makes.

By integrating the first displaceable engaging element and the second displaceable engaging element in an integrated or so-called combined engaging element, a relatively simple and/or relatively compact configuration can be provided.

By configuring the first displaceable engaging element and the adjusting element such that they can temporarily hook-in on each other, and/or by configuring the second displaceable engaging element and the adjusting element such that they can temporarily hook-in on each other, a relatively simple and/or relatively secure construction can be provided. In particular, the adjusting element may be provided with a first carrying surface on which a first engaging surface of the first displaceable engaging element can hook in so that the adjusting element can move along with the first displaceable engaging element when the transfer element coupled with the first displaceable engaging element moves from the first intermediate position to the end position, and the adjusting element may furthermore be provided with a second carrying surface on which a second engaging surface, which is formed by the second displaceable engaging element, can hook in so that the adjusting element can move along with the second displaceable engaging element when the transfer element coupled with the second displaceable engaging element moves from the first intermediate position to the initial position.

By connecting the adjusting element substantially rigidly with the cover, such that the cover directly moves along with the adjusting element when the adjusting element is moved by the first displaceable engaging element or when the adjusting element is moved by the second displaceable engaging element, a relatively simple and/or relatively compact and/or relatively secure construction can be provided. In particular, the movement of the adjusting element, such as a pivoting movement or a sliding movement, may correspond one-on-one with the movement of the cover coupled therewith.

In exemplary embodiments, the adjusting element may be mounted in the housing tiltably about a tilting axis, the adjusting element then being tiltable between at least an initial position in which the cover is in the release position and an end position in which the cover is in the covering position.

The tilting axis may then extend, for example, substantially transversely to the direction in which the first displaceable engaging element coupled with the second end of the transfer element is displaceable between its initial position and its end position or vice versa, which may for instance be advantageous when the lens of the camera is directed in a direction which is substantially in line with the transfer element.

Additionally or alternatively, the tilting axis can extend substantially transversely to the direction of a longitudinal axis around which the housing is pivotable relative to the base. As a result, parts such as the adjusting element and/or other parts can be provided on a lateral side next to the cover and/or next to the camera unit, so that a relatively low construction can be provided, as a consequence of which the housing can be made of relatively low or relatively flat design. Alternatively, the tilting axis can also extend in another direction. For example, the cover may tilt or rotate about a vertical tilting axis.

The adjustment device, in particular the adjusting element, may be provided with a first stop surface, coupled with the cover, which is configured to cooperate with a first blocking element arranged on the second side of the transfer element, in particular at or near the second end of the transfer element, while the exterior vision unit is then configured such that when, upon displacement of the transfer element from the first intermediate position to the end position, the first displaceable engaging element comes out of engagement with the adjusting element such that the first displaceable engaging element cannot cause the adjusting element to move along anymore, the first blocking element comes to abut against the first stop surface so that the first blocking element counteracts the adjusting element possibly being moved back. What may thus be counteracted, for example, is that the adjusting element may unintentionally be moved such that the cover coupled therewith can unintentionally be partly, or even wholly, closed if the engaging element concerned, after opening of the cover, is no longer in engagement with the adjusting element. Also, for example, unintentional release of the lens could be counteracted when the engaging element concerned, after closing of the cover, is no longer in engagement with the adjusting element. What could then be counteracted, for example, is that the cover opens unintentionally when the housing is folded out unintentionally from its park position, so that the lens, then too, remains protected.

In preferred embodiments, the driving device is furthermore for having the housing pivot between at least the park position and the work position. In particular, the driving device has an actuator, for example an electric motor, which is both for having the housing pivot and for adjusting the cover. This way, the exterior vision unit can be relatively compact and/or relatively inexpensive. For instance because the stroke of folding-out the housing and the stroke that, for example the second side of, the transfer element can make do not always correspond well entirely, for example due to small deviations during production, by stretching of the transfer element with the passage of time, or by thermal expansion, the engaging element coming into and out of engagement can be particularly advantageous in embodiments where a single driving device and/or single actuator both cause the housing to pivot and cause the cover to adjust, in particular when this is done at least partly simultaneously. For if the transfer element were continuously attached to the adjusting element upon opening of the cover and folding-out of the housing from its park position to its work position, the stroke which the end of the transfer element makes would actually have to coincide exactly with the stroke that the housing makes when pivoting to its work position, but it might happen, for example due to stretching or production deviations, that those strokes do not, or no longer, coincide properly.

Further, the exterior vision unit may be so configured that the housing is pivotable to an overfold position located beyond the work position. As the engaging element concerned can come out of engagement with the adjusting element, the transfer element, upon such overfolding, can be folded relatively far, in particular be retracted, without this necessarily adversely affecting the cover and/or other parts of the exterior vision unit, such as particular parts of the adjustment device. The exterior vision unit may then for instance be configured such that when the housing pivots from its work position to its overfold position, the second end of the transfer element is displaced so far that the second blocking element no longer abuts against the second stop surface. For instance to counteract the cover then being adjusted unintentionally, the adjustment device may furthermore be provided with a switchable blocking device located along an adjustment path of the transfer element, which is switchable between a blocking condition in which the blocking device counteracts the cover possibly being moved to its covering position, and a release condition in which the blocking device no longer blocks the cover, and while the exterior vision unit is so configured that when the second end of the transfer element is displaced so far that the second blocking element no longer abuts against the second stop surface when the housing pivots towards the overfold position, a first switching operating element attached to the transfer element brings the switchable blocking device in its blocking condition.

Further advantageous embodiments of the invention are set forth in the subclaims.

Figure 2:
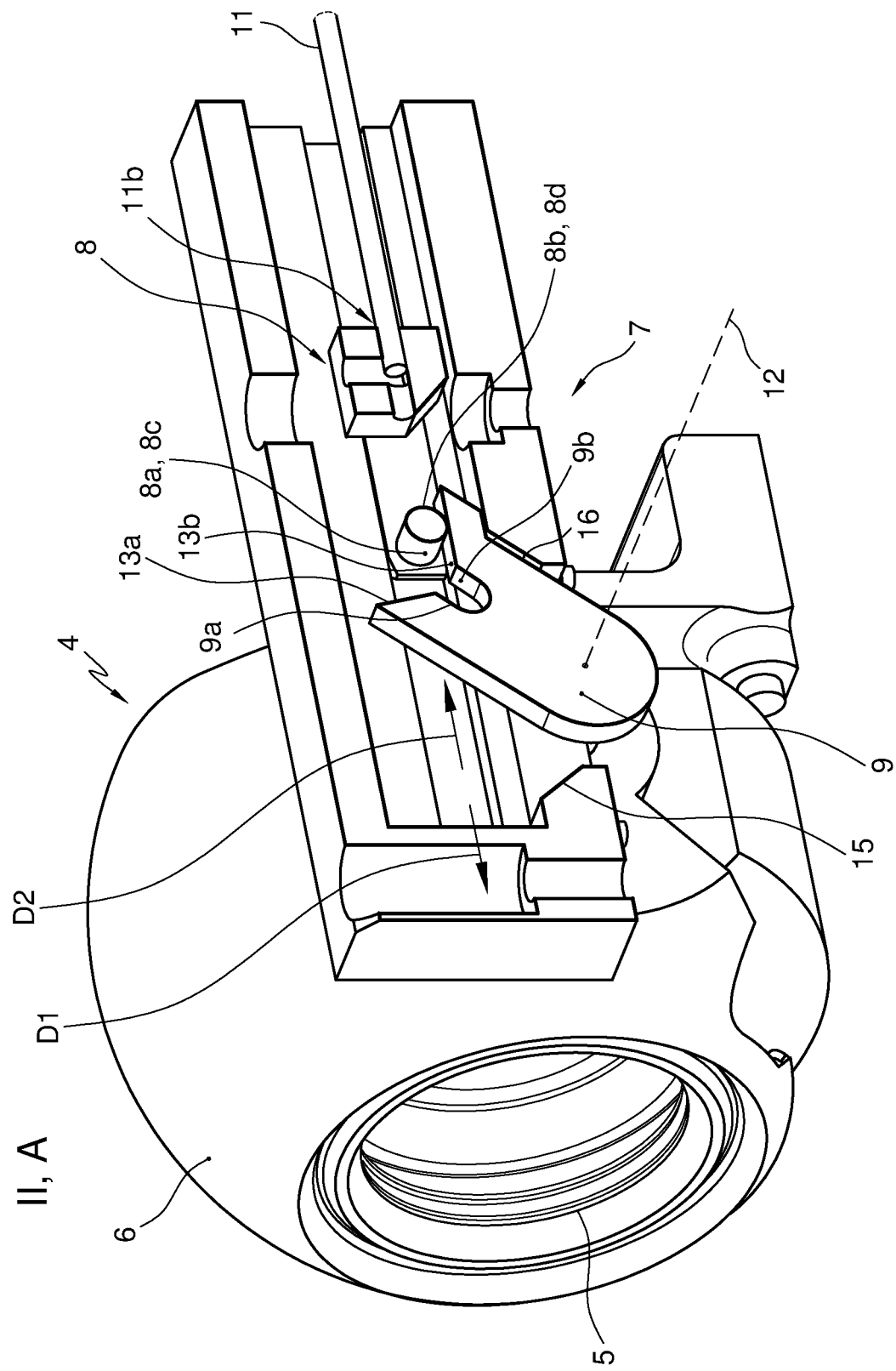
Figure 3:
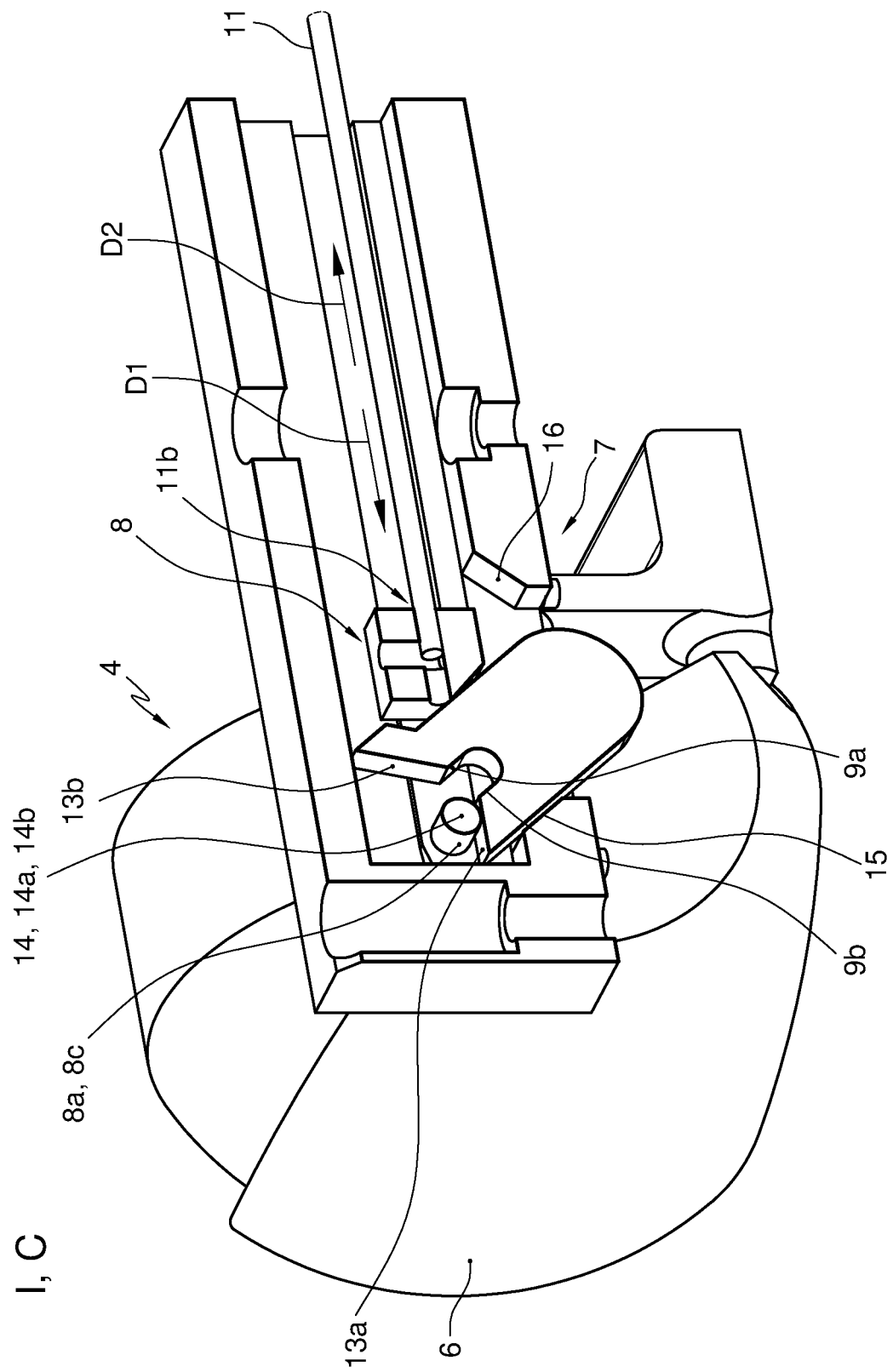
Figure 4A:
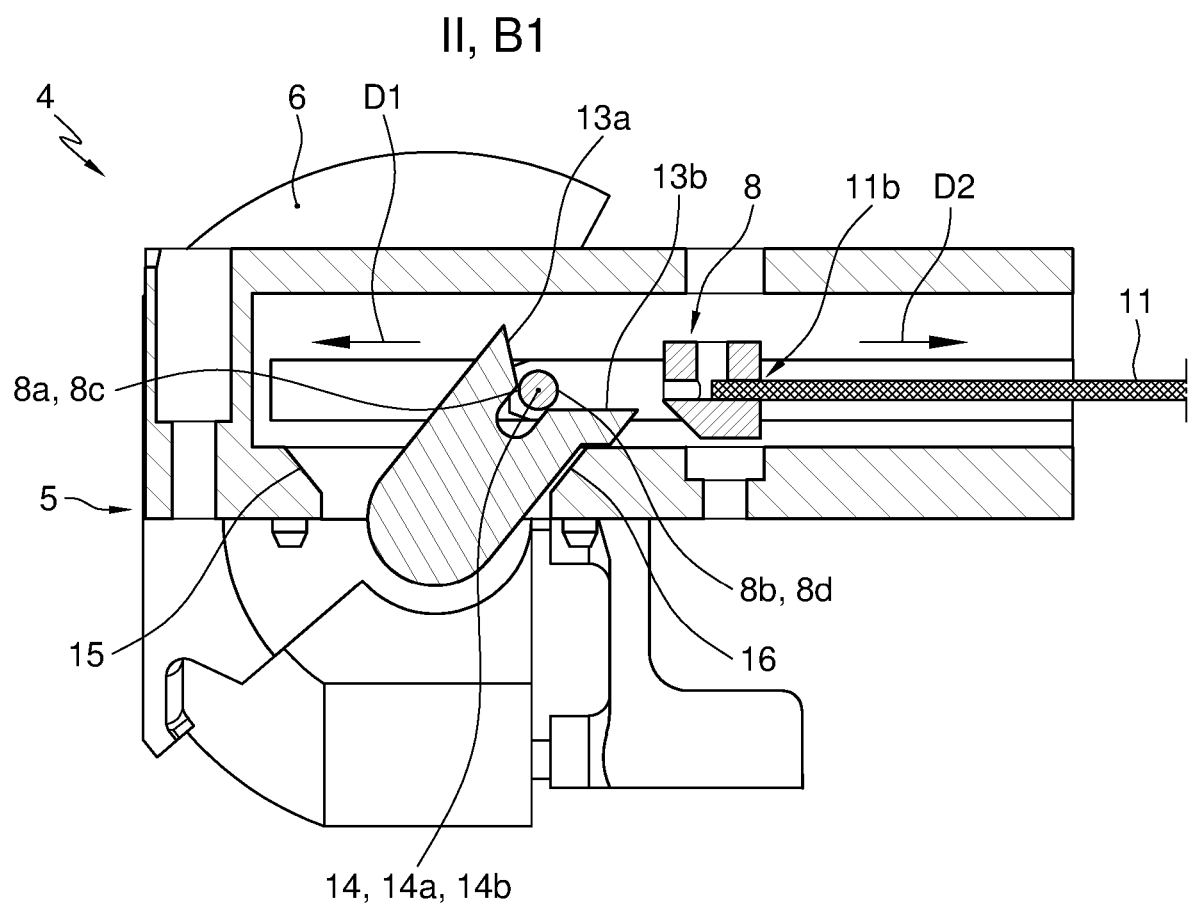
Figure 4B:
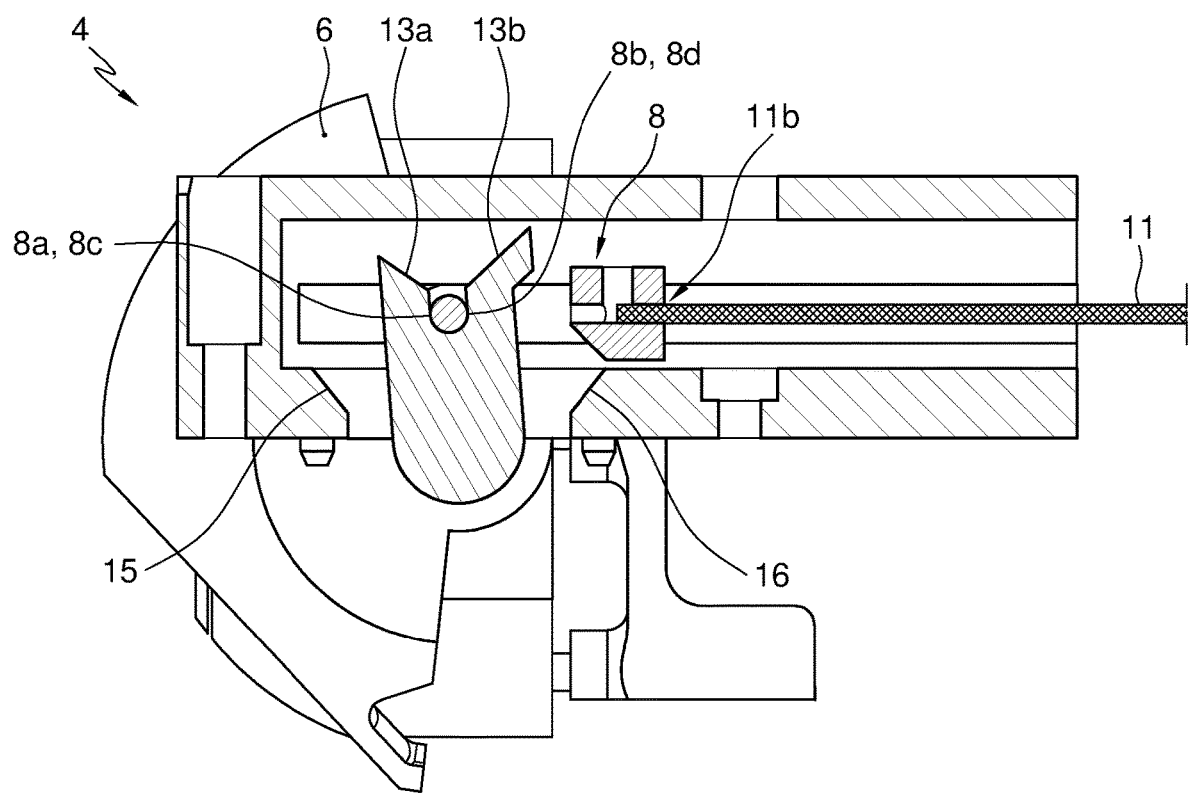
Figure 4C:
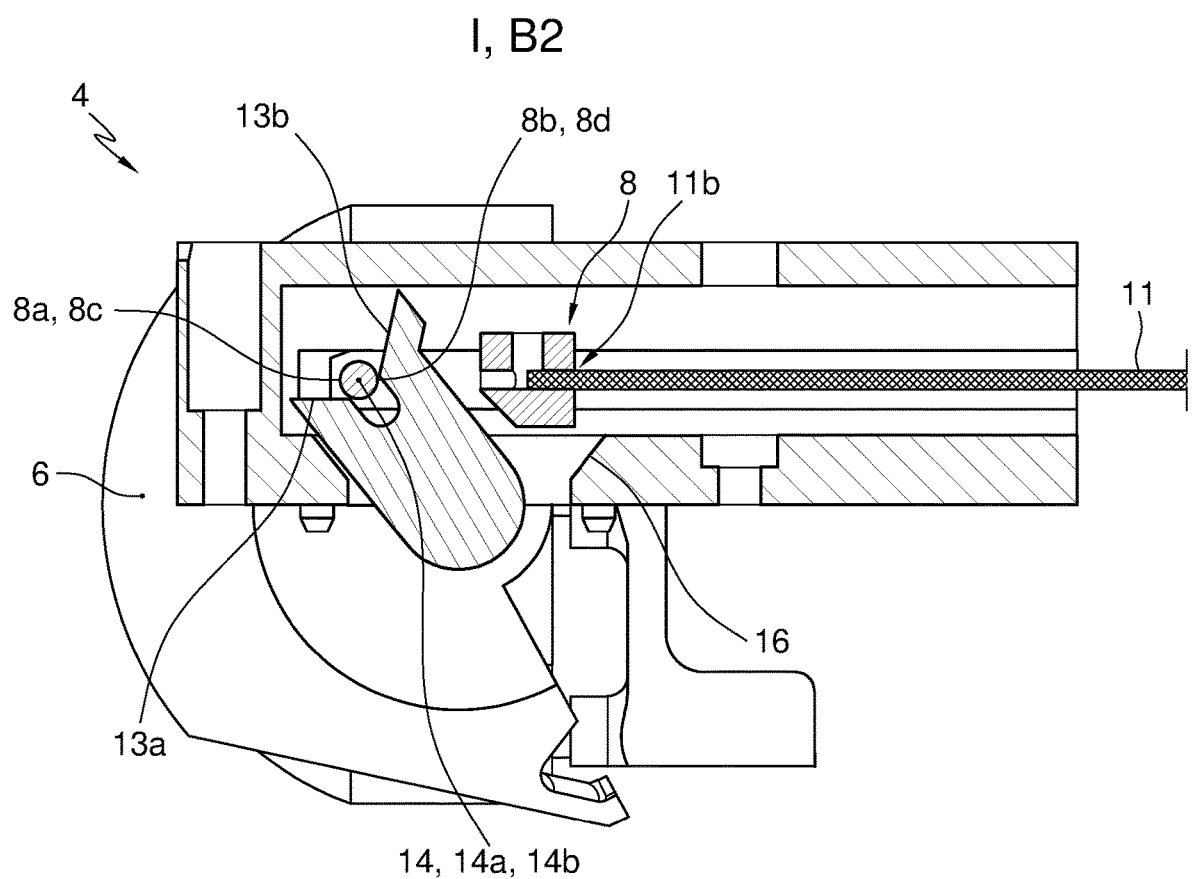
Figure 5:
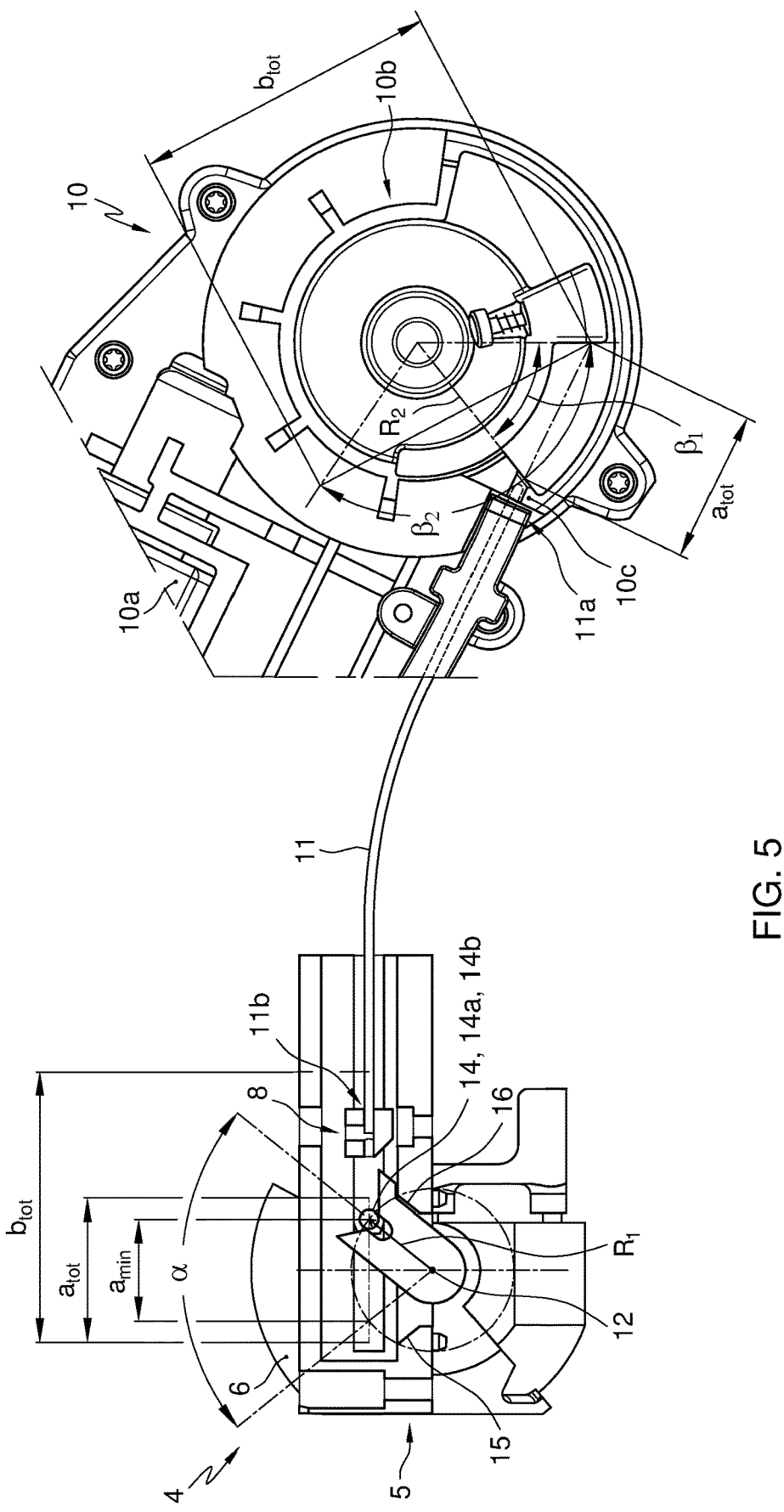
Figure 6:
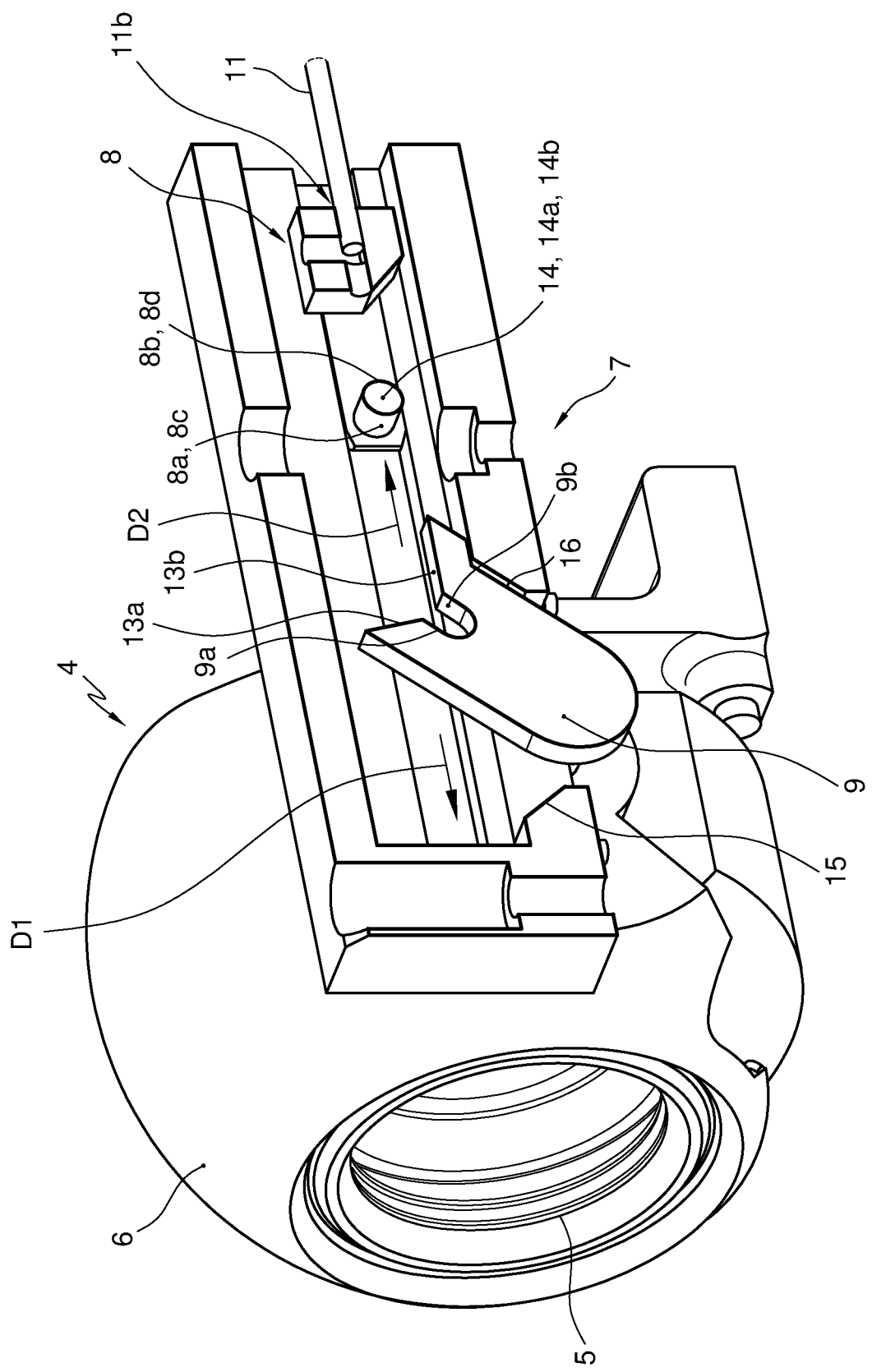
Figure 7:
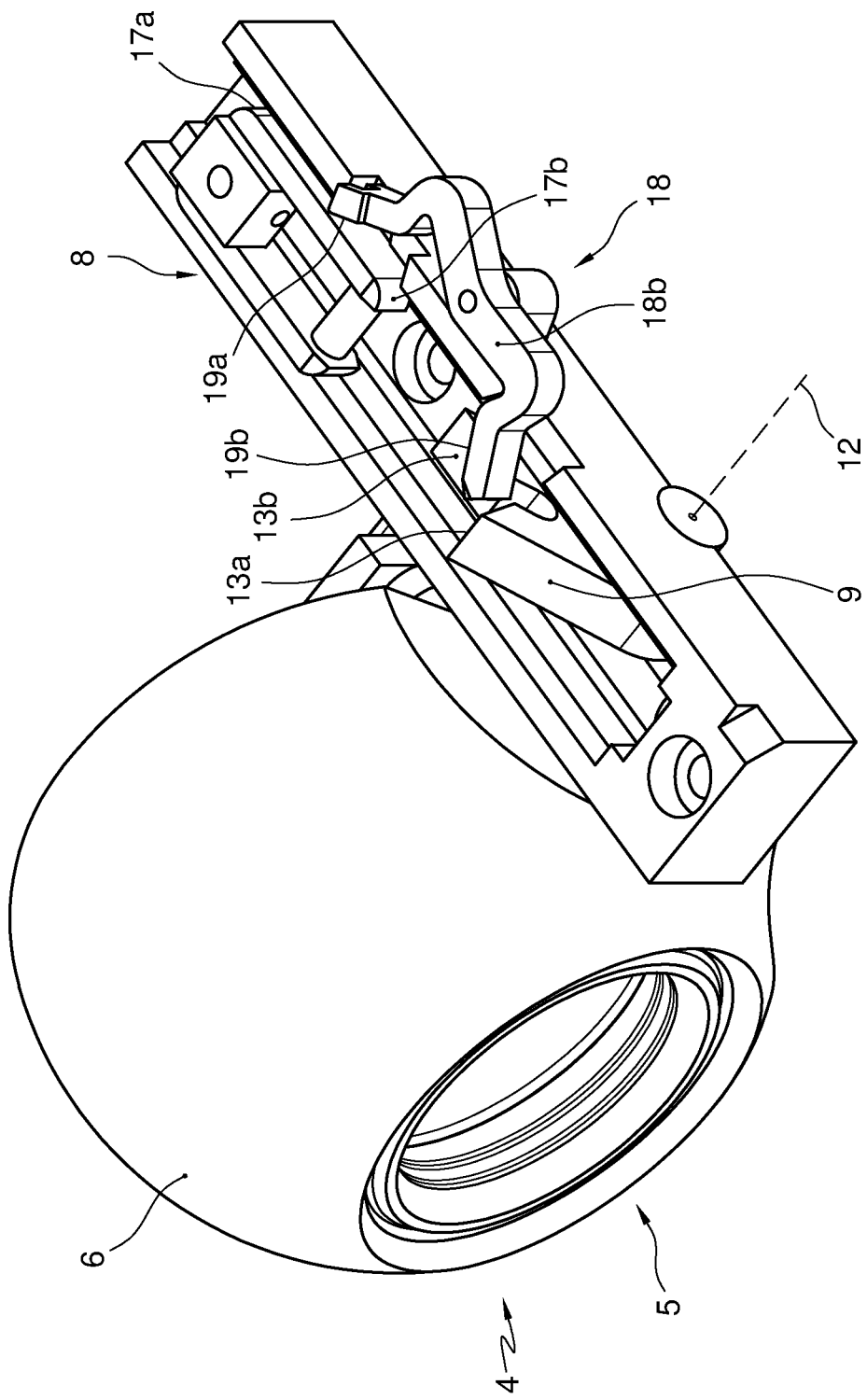

The invention will be further elucidated on the basis of exemplary embodiments represented in the drawing. In the drawing, there is shown in:

FIG. 1 a schematic, perspective view of an embodiment of an exterior vision unit according to the invention;

FIG. 2 a schematic, partly cutaway and partly sectional view of a part of the exterior vision unit of FIG. 1 in a condition in which a camera lens thereof is released by a cover;

FIG. 3 a schematic, partly cutaway and partly sectional view of the part of FIG. 2, in which the camera lens is covered;

each of FIGS. 4A-C a schematic, partly cutaway and partly sectional side view of the part of FIG. 2 and FIG. 3 in a respective one of successive steps during adjustment of the cover;

FIG. 5 a schematic representation showing both the part shown in FIGS. 2-4C as well as a schematic, partly cutaway top plan view of a drive of the exterior vision unit;

FIG. 6 a schematic, partly cutaway and partly sectional view of the part of FIG. 1 and FIG. 2, in a condition in which the exterior vision unit is in an overfold position; and FIG. 7 a second schematic, partly cutaway and partly sectional view of the part of FIG. 6 in the same condition as in FIG. 6.

It is noted that the figures are only schematic representations of a preferred embodiment of the invention, and that these are given by way of non-limiting exemplary embodiment. In the exemplary embodiment, like or corresponding parts are designated with the same reference numerals.

FIG. 1 shows an embodiment of an exterior vision unit 1 for a vehicle, in particular a motor vehicle, according to the invention. The exterior vision unit 1 comprises a base 2 for attachment to a vehicle not shown. The exterior vision unit 1 comprises a housing 3 which is pivotably mounted to the base 2. The housing 3 is pivotable at least between a park position, for example a folded-in position in which the housing extends substantially along the vehicle, and a work position, for example a drive position in which the housing extends substantially transversely to the vehicle. The exterior vision unit 1 comprises a camera unit 4 with a lens 5, accommodated in the housing 3. The exterior vision unit 1 comprises an adjustable cover 6 for temporarily covering the lens 5, which cover 6 is adjustable between a covering position I, in which it covers the lens 5 of the camera unit 4, and a release position II, in which the lens 5 of the camera unit 4 has been released by the cover 6. The exterior vision unit 1 shown in FIG. 1 comprises two camera units 4 accommodated in the housing 3, which are each provided with a lens 5. The exterior vision unit 1 in the example comprises two adjustable covers 6, one for each lens 5. The adjustable covers 6 in FIG. 1 are adjusting towards the covering position I, as indicated by red arrows. The exterior vision unit 1, of course, may also be provided with one single camera unit 4 or more than two camera units 4, which, for example, can each be covered with a cover 6 of their own. Alternatively, multiple camera units 4 could be covered with a common cover, for example when two camera units, each having for example a different viewing angle, are located relatively closely next to each other.

FIGS. 2-7 show a partly cutaway and partly sectional view of a part of the exterior vision unit 1 according to the invention. The exterior vision unit 1 comprises an adjustment device 7 for adjusting the cover 6 between its covering position I and its release position II. Additionally or alternatively, the adjustment device 7 is configured for adjusting the cover 6 between its release position II and its covering position I. The adjustment device 7 includes an adjusting element 9 which is coupled with cover 6 such that the cover 6 displaces when the adjusting element 9 is moved. In the exemplary embodiment shown, the adjusting element 9 is tiltably mounted in the housing 3, for example about an axis, the adjusting element 9 being coupled to the cover 6 via the axis. This will be further elucidated further on. The skilled person will appreciate that the adjusting element 9 may also be integrated with the cover 6, for instance forming part of the cover 6, in particular when the cover 6 is directly moved as will be elucidated further on.

The adjustment device 7 comprises a first displaceable engaging element 8a which is configured to temporarily engage the adjusting element 9 coupled with the cover 6. In this way, the adjusting element 9 coupled with the cover 6 can move along with the first displaceable engaging element 8a when the first displaceable engaging element 8a is moved while it is in temporary engagement with the adjusting element 9, as can for instance be seen in FIGS. 4A-C. The cover 6 can thereby be adjusted between its covering position I and its release position II. The skilled person will appreciate that similarly the cover 6 may conversely be adjusted between its release position II and covering position I when the first displaceable engaging element 8a, for example, is moved in an opposite direction while it is in temporary engagement with the adjusting element 9.

The adjustment device 7 comprises a driving device 10 for having the first displaceable engaging element 8a move. As can for instance be seen in FIG. 5, the driving device 10 is located at a distance from the first displaceable engaging element 8a and will be elucidated further on. The driving device 10 shown comprises an actuator 10a, such as, for example, an electric motor, and a drive train 10b with an output element 10c, such as, for example, an output gear or spindle not shown.

The adjustment device 7 comprises a transfer element 11, substantially an elongate transfer element, for transferring a movement of the driving device 10 on to the first displaceable engaging element 8a. The transfer element 11 on a first side thereof, in particular at or near a first end 11a, is coupled with the driving device 10, as, for example, via the output element 10c, such as, for example, not shown, an output gear or spindle of the drive train 10b. The transfer element 11 on a second side thereof, in particular at or near a second end 11b, is provided with the first displaceable engaging element 8a. The transfer element 11 is movable from an initial position A, as is for instance represented in FIG. 2 and will be elucidated further on, in which the first displaceable engaging element 8a is not yet in engagement with the adjusting element 9 in such a manner that the first displaceable engaging element 8a can cause the adjusting element 9 to move, to an end position C of the transfer element, as is for instance shown in FIG. 3 and will be elucidated further on. The transfer element 11 is movable between the initial position A and the end position C via at least a first intermediate position B1 (FIGS. 4A-C) of the transfer element 11 in which the first displaceable engaging element 8a engages the adjusting element 9 and causes it to move along with the first displaceable engaging element 8a. Initial position A of the transfer element 11 here corresponds to the release position II of the cover 6 and the work position ii of the exterior vision unit 1, while end position C here corresponds to the covering position I of the cover 6 and the park position i of the housing 3 of the exterior vision unit 1.

FIG. 3 shows that the exterior vision unit 1 is configured such that, in the end position C of the transfer element 11, the first displaceable engaging element 8a is no longer in such a manner in engagement with the adjusting element 9 coupled with the cover 6 that the first displaceable engaging element 8a can cause the adjusting element 9 to move. Thus, a stroke which the transfer element 11, at least the second end thereof, can make when the driving device 10 drives the transfer element 11 does not have to correspond exactly to the stroke which the adjusting element 9 should make to adjust the cover 6 from its release position II into its covering position I. It holds, in consequence, that the stroke which the transfer element 11 makes not only at the beginning of the movement does not have to be exactly in line with the movement of the adjusting element 9, but the stroke which the transfer element makes at the end of the movement also does not have to correspond exactly to the stroke of the movement which the adjusting element makes. Alternatively, the first displaceable engaging element 8a, in the end position C of the transfer element 11, can in such a manner be and/or remain in engagement with the adjusting element 9 coupled with the cover 6, as represented, for example, in FIG. 4C. In consequence, only the stroke which the transfer element 11 makes at the beginning of the movement does not have to be exactly in line with the movement of the adjusting element 9.

The transfer element 11 shown is, on its second side, in particular at or near the second end 11b, furthermore provided with a second displaceable engaging element 8b. The second displaceable engaging element 8b is configured to temporarily engage the adjusting element 9 coupled with the cover 6, so that, when the engaging element 8b is moved while it is in temporary engagement with the adjusting element 9, the adjusting element 9 coupled with the cover 6 moves along with the second displaceable engaging element 8b. In this manner, the cover 6 can be adjusted between its release position II and its covering position I and, conversely, between its covering position I and its release position II. The transfer element 11 is movable from the end position C (FIG. 3) via at least a second intermediate position B2 (FIGS. 4A-C) in which the second displaceable engaging element 8b engages the adjusting element 9 and causes it to move along with the second displaceable engaging element 8b, to the initial position A (FIG. 2) in which the second displaceable engaging element 8b is no longer in engagement with the adjusting element 9 in such a manner that the second displaceable engaging element 8b can cause the adjusting element 9 to move.

FIG. 3 shows that the exterior vision unit 1 is so configured that, in the end position C of the transfer element 11, the second displaceable engaging element 8b is not yet in engagement with the adjusting element 9 coupled with the cover 6.

FIGS. 2-7 show a partly cutaway and partly sectional view of a part of the exterior vision unit 1 according to the invention, in which the first displaceable engaging element 8a and the second displaceable engaging element 8b are integrated in an integrated engaging element 8, or a so-called combined engaging element 8. As can be seen in FIG. 7, the integrated engaging element 8 is implemented as a stick, that is, a relatively thin small bar. In this integrated manner, the configuration can be of a relatively simple and relatively compact construction. Alternatively, the first displaceable engaging element 8a may be provided separately from the second displaceable engaging element 8b, as, for example, substantially on opposite sides of the second side, in particular at or near the second end 11b, of the transfer element 11. In that case, the adjusting element 9 coupled with the cover may consist, for example, of two parts, one part being configured for temporary cooperation with the first displaceable engaging element 8a for adjusting the cover 6 between its release position II and its covering position I, and another part of the adjusting element 9 being configured for temporary cooperation with the second displaceable engaging element 8b for adjusting the cover 6 between its covering position I and its release position II.

In the case where the cover 6 is adjusted from the release position II shown in FIG. 2 to the covering position I shown in FIG. 3, and the transfer element 11, with the aid of the driving device 10, thereby moves from the initial position A to the end position C, the first adjustable engaging element 8a, referring to FIG. 2, does not yet engage the adjusting element 9. As will be elucidated further on, in FIG. 2 a blocking element integrated with a so-called combined engaging element 8 only abuts against a stop surface here integrated with the adjusting element 9, to counteract the cover being able to close unintentionally. By, with the aid of the driving device 10, moving the first adjustable engaging element 8a via the transfer element 11 in direction D1 of the end position C, the first adjustable engaging element 8a comes into engagement with the adjusting element 9 and causes the adjusting element 9 to move along with the first displaceable engaging element 8a, as, for example, represented in successive steps in FIGS. 4A-C.

In the end position C of the transfer element 11 as shown in FIG. 3, the first displaceable engaging element 8a is no longer in such a manner in engagement with the adjusting element 9 coupled with the cover 6 that the first displaceable engaging element 8a can cause the adjusting element 9 to move. Similarly to the case described above for FIG. 2, and as will be elucidated further on, in FIG. 3 a blocking element integrated with an engaging element 8 only abuts against a stop surface here integrated with the adjusting element 9 to prevent the cover being able to open up unintentionally. Further displacement of the first displaceable engaging element 8a in direction D1 does not cause the adjusting element 9 to move along (further) with the first displaceable engaging element 8a. The cover 6 is in its covering position I, and a first stop 15 which is included in the exterior vision unit 1, and which may be located in the housing 3, prevents the adjusting element 9 being able to move further on.

Conversely, in the case where the cover 6 is adjusted from the covering position I shown in FIG. 3 to the release position II shown in FIG. 2 and the transfer element 11, with the aid of the driving device 10, thereby moves from the end position C to the initial position A in direction D2, the adjusting element 9, in successive steps represented in FIG.

4C, 4B, 4A, moves along with a second displaceable engaging element 8b. In the example shown, the first and second displaceable engaging elements 8a, 8b are integrated in the integrated engaging element 8. A second stop 16 included in the exterior vision unit 1, and preferably located in the housing 3, prevents the adjusting element 9 being able to move further on.

Furthermore, FIGS. 2-7 show that the integrated engaging element 8 is locked at least partly in the housing 3, such that the housing and/or a guide included in the housing can guide the engaging element 8 to substantially prevent the engaging element 8 moving in a direction that deviates from the respectively described (movement) directions D1 and D2 of the transfer element 11.

FIGS. 4A-C show that the integrated engaging element 8 and the adjusting element 9 are configured to temporarily hook-in onto each other such that, when the integrated engaging element 8, after hooking in, moves further, the integrated engaging element 8 has the adjusting element 9 move along, that is, until the moment that the integrated engaging element 8 unhooks from the adjusting element 9. Additionally or alternatively, the first displaceable engaging element 8a and the adjusting element 9 may be configured to temporarily hook-in onto each other, and/or the second displaceable engaging element 8b and the adjusting element 9 may be configured to temporarily hook-in onto each other. The adjusting element 9 is provided with a first carrying surface 9a. On the first carrying surface 9a, a first engaging surface 8c of the first displaceable engaging element 8a can hook in. In this manner, the adjusting element 9 can move along with the first displaceable engaging element 8a when the transfer element 11, coupled with the first displaceable engaging element 8a, moves from the first intermediate position B1 (FIGS. 4A-C) to the end position C (FIG. 3). The adjusting element 9 is further provided with a second carrying surface 9b, which in the example shown is located substantially opposite the first carrying surface 9a. On the second carrying surface 9b, a second engaging surface 8d of the second displaceable engaging element 8b can hook in. In this way, the adjusting element 9 can move along with the second displaceable engaging element 8b when the transfer element 11, coupled with the second displaceable engaging element 8b, moves from the second intermediate position B2 (FIGS. 4C-A) to the initial position A (FIG. 2).

In FIGS. 2-7 it can be seen that the adjusting element 9 is substantially rigidly connected with the cover 6, such that the cover 6 moves directly along with the adjusting element 9 when the adjusting element 9 is moved by the first displaceable engaging element 8a or when the adjusting element 9 is moved by the second displaceable engaging element 8b (FIGS. 4A-C). In the example, the adjusting element 9 is tiltably mounted in the housing about a tilting axis 12. Both the cover 6 and the adjusting element 9 are rigidly mounted on the same tilting pivot 12. The adjusting element 9 is tiltable between at least an initial position in which the cover 6 is in the release position II (FIG. 4A) and an end position in which the cover is in the covering position I (FIG. 4C). The tilting axis 12 extends substantially transversely to the direction D1, D2 in which the first displaceable engaging element 8a, coupled with the second side, in particular with the second end 11b, of the transfer element 11, is displaceable between the initial position A and the end position C or the second displaceable engaging element 8b is displaceable between the end position C and the initial position A. In this manner, elegantly, a compact and/or simple construction can be obtained. Alternatively, the adjusting element 9 could be connected with the cover 6 via a transmission, such as, for example, a gear transmission.

The tilting axis 12 extends substantially transversely to the direction of an axis A3 around which the housing 3 is pivotable relative to the base 2. In this manner, a relatively flat construction can be obtained.

The adjustment device 7, in particular the adjusting element 9, is provided with a first stop surface 13a, coupled with the cover 6. The first stop surface 13a is configured to cooperate with a first blocking element 14a, arranged on the second side, in particular at or near the second end 11b, of the transfer element 11. In addition, the exterior vision unit 1 is so configured that when, upon displacement of the transfer element 11 from the first intermediate position B1 to the end position C, the first displaceable engaging element 8a comes out of engagement with the adjusting element 9 and the first displaceable engaging element 8a cannot cause the adjusting element 9 to move along anymore, the first blocking element 14a comes to lie against the first stop surface 13a (FIG. 3). In this manner, the first blocking element 14a can counteract the adjusting element 9 being moved back. What is especially counteracted in this way is that the adjusting element 9 and the cover 6 coupled therewith can unintentionally be moved such that the cover 6 can be adjusted from its covering position I to its release position II. Thus, in a relatively simple manner, access to the camera unit can be counteracted so as to counteract vandalism, for example.

In a comparable manner, the adjustment device 7, in particular the adjusting element 9, is provided with a second stop surface 13b coupled with the cover 6. The second stop surface 13b is configured to cooperate with a second blocking element 14b, arranged on the second side, in particular at or near the second end 11b, of the transfer element 11. In addition, the exterior vision unit 1 is so configured that when, upon displacement of the transfer element 11 from the second intermediate position B2 to the initial position A, the second displaceable engaging element 8b comes out of engagement with the adjusting element 9 and the second displaceable engaging element 8b cannot cause the adjusting element 9 to move along anymore, the second blocking element 14b comes to lie against the second stop surface 13b (FIG. 2). In this manner, the second blocking element 14b can counteract the adjusting element 9 being moved back. What is especially counteracted in this way is that the adjusting element 9 and the cover 6 coupled therewith can unintentionally be moved such that the cover 6 can be adjusted from its release position II to its covering position I. What can thus be counteracted in a simple manner is that the cover unintentionally adjusts towards its covering position and thereby the lens 5 of the camera unit 4 is partly, or even wholly, covered when the engaging element 8 is no longer in engagement with the adjusting element 9. This is important especially during driving, for instance to counteract any vibrations generated during driving or any uneven road surface possibly causing unwanted adjustment of the cover 6.

The exterior vision unit 1 is preferably configured such that, when the transfer element 11 is moved further, after displacement of the transfer element 11 from the first intermediate position B1 to the end position C, the first blocking element 14a is advanced along the first stop surface 13a so that the first blocking element 14a at least over a first part of such advancement continues to counteract the adjusting element 9 possibly being moved back (FIG. 3). In other words, such that the first blocking element 14a can be moved along the first stop surface 13a while the first blocking element 14a continues to abut against the first stop surface 13a.

In a comparable manner, the exterior vision unit 1 may be preferably so configured that when the transfer element 11 is moved further, after displacement of the transfer element 11 from the second intermediate position B2 to the initial position A, the second blocking element 14b is advanced along the second stop surface 13b so that the second blocking element 14b at least over a first part of such advancement continues to counteract the adjusting element 9 possibly being moved back (FIG. 2).

In the example, the respective stop surfaces 13a, 13b are both elongated, substantially in directions D1, D2, respectively. The direction D1, D2 concerned may, at the moment when the adjusting element 9 is in its position in which the cover 6 is in its covering position or its release position, substantially extend in the direction in which the transfer element 11 is movable. The respective blocking element 14a, 14b here has a round, in particular cylinder-shaped, contact surface by which it is in contact, during the blocking of the adjusting element 9, with the respective stop surface 13a, 13b. In this manner, the respective blocking element 14a, 14b can relatively simply, and with relatively little friction, slide along the respective stop surface 13a, 13b when the first end of transfer element 11 is still making a part of its stroke while the cover 6 has already been set in its release position or its covering position. It will be appreciated by the skilled person that this could also be done differently, for example with little wheels. Alternatively, the respective blocking elements 14a, 14b may be triangle-shaped, prism-shaped, or have any other suitable shape. This could also be the other way around. That is, the blocking element 14a, 14b, coupled to and moving along with the transfer element 11, then comprises an elongated blocking surface, and the respective stop surface 13a, 13b comprises a, for example round cylinder-shaped, stop surface along which such elongated blocking surface can then advance.

In the example, the first 14a and the second blocking element 14b are integrated in an integrated, or so-called combined, blocking element 14. The first blocking element 14a is furthermore integrated in the second engaging element 8b and the second blocking element 14b is integrated in the first engaging element 8a. In addition, the engaging elements 8a, 8b and hence also the blocking elements 14a, 14b, are all integrated with each other in the engaging element 8. As described earlier and can be seen in FIG. 7, the integrated engaging element 8 is implemented as a stick, that is, a relatively thin little bar. In the partial cross section of FIGS. 2-6 it can be seen that the integrated engaging element 8 comprises a circular cross section, but a triangular, square or other shape is also possible. A circular cross section can advantageously reduce friction generated during advancement of the integrated engaging element 8 along the respective stop surfaces 13a, 13b, while the blocking action remains preserved. Moreover, by application of such an engaging element 8, space can be provided for tilting of the adjusting element 9, in particular for the elongated stop surfaces 13a, 13b. This is for instance represented in FIG. 3, where stop surface 13b has room to tilt behind the engaging element 8.

As described earlier, in the example the exterior vision unit 1 is furthermore provided with respective stops 15, 16 to prevent the adjusting element 9 moving further on when the adjusting element 9 has come out of engagement with, respectively, the first displaceable engaging element 8a, as, for example, when this moves from the position represented in FIG. 4C to the position represented in FIG. 3, and the second displaceable engaging element 8b, as, for example, when this moves from the position represented in FIG. 4A to the position represented in FIG. 2. Tilting of adjusting element 9 can then be counteracted in both directions, that is, on one side by the first stop 15 and on the other side by the first blocking element 14a which abuts against the first stop surface 13a (FIG. 3). Similarly, in FIG. 2, tilting of adjusting element 9 can be counteracted in both directions, that is, on one side by the second stop 16 and on the other side by the second blocking element 14b which abuts against the second stop surface 13b. Thus, the adjusting element 9 may be substantially confined and unintentional adjustment of the cover 6 between its covering position I and release position II, or vice versa, can be counteracted. Moreover, when the adjusting element 9 is carried along by the respective engaging element 8a, 8b in a particular direction D1, D2, the other engaging element 8b, 8a together with the respective carrying surface 9b, 9a counteracts the cover 6 being able to move unintentionally, for instance as a result of vibrations, in a direction D2, D1 opposite to the direction D1, D2 in which it is being pushed on by said respective engaging element 8a, 8b. Thus, the integrated engaging element 8 can sit substantially confined, as can be seen, for example, in FIG. 4B.

FIG. 5 furthermore shows a partly cutaway top plan view of a drive of the exterior vision unit 1. The driving device 10 is furthermore for having the housing 3 pivot between at least the park position and the work position. In particular, the driving device 10 comprises an actuator 10a, such as, for example, an electric motor, which is both for having the housing 3 pivot and for adjusting the cover 6. An earlier-mentioned variant of the driving device 10, where the output element 10c is implemented with an output gear or spindle, may, for example, with a rotation-translation converter on the drive train 10b, be used in the exterior vision unit 1 for having a linear movement executed of the transfer element 11 coupled to the driving device 10, in particular the output element 10c, for adjustment of the engaging element 8 coupled on the second side, in particular at or near the second end 11b, or adjustment of the respective engaging elements 8a, 8b. In this manner, elegantly, the driving device 10 can be placed at a distance from the integrated engaging element 8. In the example, the transfer element 11 is implemented as a flexible cable, in particular a cable of plastics. When such a cable is applied, the exterior vision unit 1, may for instance be further provided with a cable guide, not shown, and/or one or more other guide means to counteract the cable getting entangled in the housing 3 and/or in parts or devices accommodated in the housing 3, as, for example, a blinker module. It is for instance possible to implement the flexible cable as a Bowden cable, familiar to the skilled person, in which a cable guide may then be integrated. Further, it is for instance also possible to implement the transfer element 11, instead of as a flexible cable, as a relatively rigid driving rod or driving rod mechanism, or as a combined gearwheel-gear rack combination.

As represented in FIG. 5, at least during a part of the pivoting of the housing 3, the transfer element 11 is driven such that the second end 11b thereof is moved. That is, the respective engaging element 8a, 8b located on the second side, in particular at or near the second end 11b, of the transfer element 11, is coupled with the adjusting element 9 coupled with the cover 6 only during a part of the pivoting, so that the cover 6 is adjusted between its covering position I and its release position II, or conversely between its release position II and its covering position I, only during a part of the pivoting of the housing 3 between its park position and its work position, or conversely between its work position and its park position. This is schematically represented by means of adjustment distances and adjustment angles shown in FIG. 5. A part of the driving device 10 that is coupled with the transfer element 11, such as, for example, the output element 10c, may, for instance for the purpose of pivoting of the housing 3 between its park position and its work position, make a stroke that corresponds to the adjustment angle $\beta_1$ indicated in FIG. 5. The adjustment distance $a_{tot}$ corresponding with adjustment angle $\beta_1$ is imparted to the transfer element 11 coupled with the driving device 10. The engaging element 8 in turn coupled with the second side, in particular at or near the second end 11b, of the transfer element 11, moves furthermore during the pivoting of the housing over the adjustment distance $a_{tot}$. As described earlier, the engaging element 8, or its respective engaging elements 8a, 8b, causes the adjusting element 9 to move along only when the engaging element 8 is in engagement with the adjusting element 9. In this manner, the adjusting element 9 only moves along over the adjustment distance $a_{min}$, where $a_{min}$ is less than $a_{tot}$. In this way, the driving device 10, at least during a part of the pivoting of the housing 3 (adjustment angle $\beta_1$ and adjustment distance $a_{tot}$), can adjust the cover 6 through adjustment angle $\alpha$ between its covering position I and its release position II, or vice versa, where adjustment angle $\alpha$ corresponds to the adjustment distance $a_{min}$ traveled by the respective engaging element 8a, 8b temporarily coupled with the adjusting element 9. Advantageously, in this manner an exterior vision unit 1 can be provided with a feature called free movement or free travel, this free movement corresponding to a distance $a_{free}=\frac{1}{2}(a_{tot}-a_{min})$. This is to say that the transfer element 11 during the free movement $a_{free}$ is at least movable from an initial position A in which the first displaceable engaging element 8a is not yet in such a manner in engagement with the adjusting element 9 that the first displaceable engaging element 8a can cause the adjusting element 9 to move to a first intermediate position B1 and, similarly, that the transfer element 11 during the free movement $a_{free}$ is at least movable from an end position C in which the second displaceable engaging element 8b is not yet in such a manner in engagement with the adjusting element 9 that the second displaceable engaging element 8b can cause the adjusting element 9 to move to a second intermediate position B2. Moreover, respective blocking elements 14a, 14b can be moved during the free movement while they continue to abut substantially against the respective (elongated) stop surfaces 13a, 13b of the adjusting element 9. In this manner, during the free movement $a_{free}$ the adjusting element 9 is not adjusted, while the blocking action is preserved.

In the example, the housing 3 is furthermore pivotable to an overfold position located beyond the work position. FIG. 6 shows a partly cutaway and partly sectional view of a part of the exterior vision unit 1, in a condition in which the exterior vision unit 1 is in an overfold position. The exterior vision unit 1 is so configured that when the housing 3 pivots from its work position, or from its park position, to its overfold position, the second side, in particular the second end 11b, of the transfer element 11, is displaced so far that the second blocking element 14b no longer abuts against the second stop surface 13b. By limiting the dimension of the second stop surface 13b, the drawback of the configuration of the exterior vision unit 1 becoming relatively large, in particular relatively high, can be counteracted. However, as can for instance be derived from FIG. 4C, the second stop surface 13b may, in embodiments, also be of relatively long design without this immediately having to entail an adverse effect on the magnitude of the exterior vision unit 1. Such a relatively long second stop surface 13b may even be advantageous, for example in that, in consequence thereof, a switchable blocking device 18, for instance one such as will be discussed below, can be omitted, while it can still be made possible that when the housing 3 pivots from its work position to its overfold position, the cover 6 can remain blocked in its release position.

In FIG. 5, an adjustment angle from the release position to the overfold position is schematically represented by adjustment angle $\beta_2$ and the total adjustment distance which the transfer element 11 can travel, when the housing 3 moves from its park position to its extreme overfold position, represented by adjustment distance $b_{tot}$.

FIG. 7 shows a second partly cutaway and partly sectional view of a part of the exterior vision unit 1, in a condition in which the exterior vision unit 1 is in an overfold position. The adjustment device 7 is furthermore provided with a switchable blocking device 18, located along an adjustment path V of the transfer element 11, which is switchable between a blocking condition III in which the blocking device 18 counteracts the cover 6 possibly being moved to its covering position I and a release condition in which the blocking device 18 no longer blocks the cover 6. In FIG. 7, the blocking condition III is represented. The exterior vision unit 1 is so configured that, when the second side, in particular the second end 11b, of the transfer element 11 is displaced so far that the second blocking element 14b no longer abuts against the second stop surface 13b when the housing pivots towards the overfold position, a first switching operating element 17a attached to the transfer element 11, preferably on the second side, in particular at or near the second end 11b, of the transfer element 11, brings the switchable blocking device 18 in its blocking condition III. The switching operating element 17a in this example is integrated with the integrated engaging element 8. Alternatively, the switching operating element 17a may be integrated with at least one of the respective engaging elements 8a, 8b and/or with at least one of the respective blocking elements 14a, 14b.

The switchable blocking device 18 comprises a blocking surface 18a which in the blocking condition III of the blocking device 18 cooperates with a blocking stop surface 19 coupled with the cover 6, which blocking stop surface 19 in the example is provided on the adjusting element 9. In particular, the blocking stop surface 19 is formed by the second stop surface 13b coupled with the cover 6, which second stop surface 13b in this example is provided on the adjusting element 9.

In this example, the switchable blocking device 18 comprises a pivotable tilting arm 18b. The pivotable tilting arm 18b is, preferably at a first end, provided with the blocking surface 18a. Furthermore, the pivotable tilting arm 18b is, preferably at an opposite second end, provided with a first carrying surface 19a which is configured to cooperate with the first switching operating element 17a such that it causes the pivotable tilting arm 18b to pivot such that the switchable blocking device 18 comes from its release condition into its blocking condition III. Preferably, the first carrying surface 19a is so configured that it cooperates with the first switching operating element 17 (just) before the second blocking element 14b comes out of abutment with the second stop surface 13b. Also, in this example, a second switching operating element 17b is provided which can cooperate with a second carrying surface 19b to bring the switchable blocking device 18 from its blocking condition III back to its release condition, in particular (just) after the second blocking element 14b has come to lie against the second stop surface 13b again.

It will be clear to the skilled person that the engaging element 8 and/or the adjusting element 9 may for instance be implemented as a magnet or magnetized material. In the case where the engaging element 8 or the adjusting element 9 comprises a magnet or is at least partly made of a magnetized material, the other of the two elements may for instance also comprise a ferromagnetic material or be made of a ferromagnetic material, so that the engaging element 8 and the adjusting element 9 can engage each other. The adjusting element 9 may also be integrated with the cover 6, so that the engaging element 8 is configured to engage in a compact manner the adjusting element integrated with the cover.

It is noted that the invention is not limited to the exemplary embodiments described here. Thus, the exterior vision unit may for instance be provided with many other functions, such as a stop which, during manual adjustment from the work position both in the direction of the park position and in the direction of the overfold position, forms a physical or aural stop which is not present during electric adjustment, at least adjustment in the direction of the park position. Such a function is known as 'double detent'. Also, the cooperating cams may be spring loaded in the work position, for example by a helical spring included around the pivoting shaft, and this spring load may be removed before the housing pivots electrically from the work position relative to the base. This may be implemented, for instance, in that the driving device makes an internal stroke, as a result of which the spring force is transferred from the housing to the base. Such functions of exterior vision units are known per se, and are described, for example, in WO 2005/075249, WO 2012/047104 and WO 2017/074193. Also, it is noted that in particular embodiments the work position and the extreme overfold position may coincide, for example to enable an aerodynamically formed connection with the rest of a vehicle bodywork, for instance in a manner that is comparable to the mirror construction of an Opel Vectra from the year 2000.

Such variants will be apparent to the person skilled in the art and are understood to fall within the scope of the invention as set forth in the following claims.

LIST OF REFERENCE NUMERALS

1. Exterior vision unit
2. Base
3. Housing
4. Camera unit
5. Lens
6. Cover
7. Adjustment device
8. Integrated engaging element
8a, 8b. Respective first and second displaceable engaging element
8c, 8d. Respective first and second engaging surface
9. Adjusting element
9a, 9b. Respective first and second carrying surface
10. Driving device
10a. Actuator
10b. Drive train
10c. Output element
11. Transfer element
11a, 11b. Respective first and second end of the transfer element
12. Tilting axis
13a, 13b. Respective first and second stop surface
14a, 14b. Respective first and second blocking element
15. First stop
16. Second stop
17a, 17b. Respective first and second switching operating element
18. Blocking device
18a. Blocking surface
18b. Tilting arm
19. Blocking stop surface
19a, 19b. Respective first and second carrying surface of tilting arm
I. Covering position
II. Release position
III. Blocking position
A. Initial position
B1. First intermediate position
B2. Second intermediate position
C. End position
i. Park position of the housing
ii. Work position of the housing
iii. Extreme overfold position of the housing
A3. Longitudinal axis
D1. First direction of movement of the transfer element
D2. Second direction of movement of the transfer element
$a_{tot}$. Total adjustment distance of the engaging element upon adjustment of the cover
$a_{min}$. Minimum adjustment distance of the engaging element to wholly adjust the cover
$b_{tot}$. Total adjustment distance of the engaging element upon adjustment of the housing between the park position and the extreme overfold position
α. Adjustment angle of the cover
$β_1$. First adjustment angle of the output element of the driving device
$β_2$. Second adjustment angle of the output element of the driving device

The invention claimed is:

1. An exterior vision unit for a vehicle, comprising
a base for attachment to the vehicle;
a housing which is pivotably mounted to the base, and which is pivotable at least between i) a park position, ii) a work position and iii) an extreme overfold position;
a camera unit with a lens, accommodated in the housing;
an adjustable cover for temporarily covering the lens, which cover is adjustable between a covering position, in which it covers the lens of the camera unit, and a release position, in which the lens of the camera unit is released by the cover; and
an adjustment device for adjusting the cover between its covering position and its release position or vice versa, wherein the adjustment device comprises:
an adjusting element which is coupled with the cover, such that the cover adjusts when the adjusting element is moved; and
a first displaceable engaging element which is configured to temporarily engage the adjusting element coupled with the cover.

2. The exterior vision unit according to claim 1, wherein the exterior vision unit is configured such that, when the first displaceable engaging element is moved while it is in temporary engagement with the adjusting element, the adjusting element coupled with the cover moves along with the first displaceable engaging element so that the cover is adjusted between its covering position and its release position or vice versa.

3. The exterior vision unit according to claim 1, wherein the adjustment device comprises a driving device for having the first displaceable engaging element move, wherein the driving device is located at a distance from the first displaceable engaging element.

4. The exterior vision unit according to claim 3, wherein the adjustment device comprises a transfer element for transferring a movement of the driving device on to the first displaceable engaging element, wherein the transfer element on a first side is coupled with the driving device and on a second side is provided with the first displaceable engaging element, wherein the transfer element is movable from an initial position in which the first displaceable engaging element is not yet in such a manner in engagement with the adjusting element that the first displaceable engaging element can cause the adjusting element to move, via at least a first intermediate position of the transfer element in which the first displaceable engaging element engages the adjusting element and causes it to move along with the first displaceable engaging element, to an end position of the transfer element.

5. The exterior vision unit according to claim 1, wherein the exterior vision unit is configured such that, in the end position of the transfer element, the first displaceable engaging element is no longer in such a manner in engagement with the adjusting element coupled with the cover that the first displaceable engaging element can cause the adjusting element to move.

6. The exterior vision unit according to claim 1, wherein the transfer element on its second side is provided with a second displaceable engaging element which is configured to temporarily engage the adjusting element coupled with the cover, so that, when the engaging element is moved while it is in temporary engagement with the adjusting element, the adjusting element coupled with the cover moves along with the second displaceable engaging element so that the cover is adjusted between its release position and its covering position or vice versa, and wherein the transfer element is movable from the end position via at least a second intermediate position in which the second displaceable engaging element engages the adjusting element and causes it to move along with the second displaceable engaging element, to the initial position in which the second displaceable engaging element is no longer in such a manner in engagement with the adjusting element that the second displaceable engaging element can cause the adjusting element to move.

7. The exterior vision unit according to claim 6, wherein the exterior vision unit is configured such that, in the end position of the transfer element, the second displaceable engaging element is not yet in engagement with the adjusting element coupled with the cover.

8. The exterior vision unit according to claim 6, wherein the first displaceable engaging element and the second displaceable engaging element are integrated in an integrated engaging element.

9. The exterior vision unit according to claim 1, wherein the first displaceable engaging element and the adjusting element are configured to temporarily hook in on each other, and/or wherein the second displaceable engaging element and the adjusting element are configured to temporarily hook in on each other.

10. The exterior vision unit according to claim 9, wherein the adjusting element is provided with a first carrying surface on which a first engaging surface of the first displaceable engaging element can hook in so that the adjusting element can move along with the first displaceable engaging element when the transfer element coupled with the first displaceable engaging element moves from the first intermediate position to the end position, and wherein the adjusting element is provided with a second carrying surface on which a second engaging surface of the second displaceable engaging element can hook in so that the adjusting element can move along with the second displaceable engaging element when the transfer element coupled with the second displaceable engaging element moves from the first intermediate position to the initial position.

11. The exterior vision unit according to claim 1, wherein the adjusting element is substantially rigidly connected with the cover, such that the cover directly moves along with the adjusting element when the adjusting element is moved by the first displaceable engaging element or when the adjusting element is moved by the second displaceable engaging element.

12. The exterior vision unit according to claim 1, wherein the adjusting element is tiltably mounted in the housing around a tilting axis, and wherein the adjusting element is tiltable between at least an initial position in which the cover is in the release condition and an end position in which the cover is in the covering position.

13. The exterior vision unit according to claim 12, wherein the tilting axis extends substantially transversely to the direction in which the first displaceable engaging element coupled with the second side of the transfer element is displaceable between its initial position and its end position or vice versa.

14. The exterior vision unit according to claim 12, wherein the tilting axis extends substantially transversely to the direction of a longitudinal axis around which the housing is pivotable relative to the base.

15. The exterior vision unit according to claim 1, wherein the adjustment device is provided with a first stop surface coupled with the cover, which is configured to cooperate with a first blocking element arranged on the second side of the transfer element, and wherein the exterior vision unit is configured such that when, upon displacement of the transfer element from the first intermediate position to the end position, the first displaceable engaging element comes out of engagement with the adjusting element and the first displaceable engaging element can no longer cause the adjusting element to move along anymore, the first blocking element comes to lie against the first stop surface so that the first blocking element counteracts the adjusting element possibly being moved back.

16. The exterior vision unit according to claim 15, wherein the housing is furthermore pivotable to an overfold position located beyond the work position, and wherein the exterior vision unit is configured such that when the housing pivots from its work position to its overfold position, the second end of the transfer element is displaced so far that the second blocking element no longer abuts against the second stop surface.

17. The exterior vision unit according to claim 16, wherein the adjusting device is furthermore provided with a switchable blocking device located along an adjustment path of the transfer element, which is switchable between a blocking condition in which the blocking device counteracts the cover possibly being moved to its covering position, and a release position in which the blocking device no longer blocks the cover, and wherein the exterior vision unit is configured such that, when the second end of the transfer element is displaced so far that the second blocking element no longer abuts against the second stop surface when the housing pivots towards the overfold position, a first switching operating element attached to the transfer element brings the switchable blocking device into its blocking condition.

18. The exterior vision unit according to claim 17, wherein the switchable blocking device comprises a blocking surface which in the blocking condition of the blocking device cooperates with a blocking stop surface coupled with the cover.

19. The exterior vision unit according to claim 18, wherein the switchable blocking device is, or comprises, a pivotable tilting arm, wherein the tilting arm is provided with the blocking surface and furthermore is provided with a first carrying surface which is configured to cooperate in such a manner with the first switching operating element that it causes the pivotable tilting arm to pivot such that the switchable blocking device comes from its release condition into its blocking condition.

20. The exterior vision unit according to claim 19, wherein the blocking surface is provided at a first end of the tilting arm, and wherein the first carrying surface is provided at an opposite second end of the tilting arm.

21. The exterior vision unit according to claim 1, wherein the adjusting device is provided with a second stop surface, coupled with the cover, which is configured to cooperate with a second blocking element arranged on the second side of the transfer element, and wherein the exterior vision unit is configured such that when, upon displacement of the transfer element from the second intermediate position to the initial position, the second displaceable engaging element comes out of engagement with the adjusting element and the second displaceable engaging element can no longer cause the adjusting element to move along, the second blocking element comes to abut against the second stop surface so that the second blocking element counteracts the adjusting element possibly being moved back.

22. The exterior vision unit according to claim 1, wherein the driving device is furthermore for having the housing pivot between at least i) the park position and ii) the work position.

23. The exterior vision unit according to claim 22, wherein at least during a part of the pivoting of the housing the transfer element is driven such that the second end thereof is moved, and wherein the respective engaging element located on the second side of the transfer element, is coupled only during a part of the pivoting with the adjusting element coupled with the cover, so that the cover is adjusted between its covering position and its release position or vice versa during only a part of the pivoting of the housing between its park position and its work position or vice versa.

24. The exterior vision unit according to claim 1, wherein the housing is furthermore pivotable to an overfold position located beyond the work position.

25. The exterior vision unit according to claim 1, wherein the adjustable cover for temporarily covering the lens is fitted to, on and/or in the housing.

26. The exterior vision unit according to claim 1, wherein the adjustable cover is adjustable relative to the lens.

27. The exterior vision unit according to claim 1, wherein at least during a part of the pivoting of the housing the transfer element is driven such that the second end thereof is moved, and wherein the respective engaging element located on the second side of the transfer element, is coupled only during a part of the pivoting with the adjusting element coupled with the cover, so that the cover is adjusted between its covering position and its release position or vice versa during only a part of the pivoting of the housing between its park position and its work position or vice versa.

* * * * *